United States Patent

[11] 3,631,909

[72] Inventor Friedrich Otto
 Hamelin, Germany
[21] Appl. No. 866,232
[22] Filed Oct. 14, 1969
[45] Patented Jan. 4, 1972
[73] Assignee A. Stephan und Sohne
 Hameln/Weser, Germany
[32] Priority Oct. 19, 1968
[33] Germany
[31] P 18 04 075.0

[54] COMMINUTING APPARATUS
 18 Claims, 4 Drawing Figs.
[52] U.S. Cl. .................................................. 146/182 R
[51] Int. Cl. ..................................................... B02c 18/00
[50] Field of Search .......................................... 146/182,
 192, 79, 183

[56] References Cited
 UNITED STATES PATENTS
 3,219,081 11/1965 Brundler ..................... 146/192 X
 3,109,471 11/1963 Highley ...................... 146/192 X
 3,340,917 9/1967 Vedvik ........................ 146/182

*Primary Examiner*—Willie G. Abercrombie
*Attorney*—Michael S. Striker

ABSTRACT: A comminuting apparatus includes a housing having an inlet for material to be comminuted. A first comminuting assembly is arranged in the housing in the path of incoming material and includes a pair of concentric annular comminuting members having facing cutting edges between which the material passes to be comminuted. Downstream of the first assembly is a second comminuting assembly which receives material from the first assembly and which includes a stationary apertured plate member and a cutter member mounted adjacent one major surface of the plate member for rotation relative to the latter in sliding contact with this major surface. Drive means rotates one of the annular comminuting members and the cutter member.

PATENTED JAN 4 1972 3,631,909

INVENTOR
FRIEDRICH OTTO
BY
ATTORNEY

COMMINUTING APPARATUS

BACKGROUND OF THE INVENTION

The present invention relates generally to comminuting apparatus, and more particularly to apparatus for comminuting raw or cooked meat and similar materials.

Comminuting apparatus for comminuting raw or cooked meat and similar materials are already well known. Thus, a comminuting apparatus is known which utilizes for comminuting purposes an apertured plate member and a cutter member which rotates with reference to the apertured plate member and is in pressure engagement with a major surface thereof. The material is comminuted by passage through the apertures in the plate member and the action of the rotating cutting member. However, in these constructions there is metal-to-metal contact between the plate member and the cutter member which cannot be avoided, and which results in relatively rapid wear leading to frequent sharpening of the cutting portions on the cutter member and the apertured plate member, or replacement of these members.

A further problem with this type of construction resides in the fact that the cutter member must engage the apertured plate member with such pressure that the friction resulting from the relative rotation of these members leads to excessive development of heat. Other problems also exist. Thus, the meat or other materials usually are not of homogenous composition. Discussing this with reference to the comminuting of meat, it is pointed out that this contains inter alia gristle, tendons, rinds and similar substances which are relatively hard and cannot be comminuted under the same circumstances as the softer components of the meat. To assure that the cutter knives of the cutting member will not be deflected out of engagement with the plate member when encountering such relatively hard substances, it is necessary that the cutter member engage the plate member with a certain pressure. On the other hand, this pressure is dependent on the composition of the meat which is being comminuted at any given time and this requires that the contact pressure by adjustable even during operation of the comminuting apparatus. A given desired degree of fineness in comminution of the material is determined by the size of the apertures in the apertured plate member. The finer the comminution is to be, the smaller must be the apertures. This, on the other hand, frequently means that the apertures are too small to permit comminuting of the harder components of the meat.

Attempts have been made to overcome this problem by providing two comminuting assemblies with the material comminuted in the first assembly being passed on to the second assembly for renewed comminution. In these constructions the first comminuting assembly utilizes an apertured plate member having apertures of larger cross-sectional area than those provided in the apertured plate member of the second or fine-comminuting assembly. The purpose, of course, is to have the apertures in the first plate member be larger to guarantee proper comminuting of even the harder components of the meat whereas the smaller apertures in the plate member of the second comminuting assembly are intended to guarantee the desired degree of fine comminution. However, the contact pressure with which the cutter member of the first comminuting assembly engages the associated plate member must naturally be greater than in the second comminuting assembly, because the harder components of the meat are already partially comminuted by the time they reach the second assembly so that the contact pressure can be correspondingly lower. Because of these differential pressure requirements, constructions of this type cannot utilize a single adjusting arrangement for adjusting the contact pressure, but instead require separate adjusting arrangements for adjusting the contact pressure of the first and second comminuting assemblies, respectively. This results in a very elaborate and expensive construction which is subject to breakdown and still does not guarantee trouble-free comminuting of the aforementioned harder components of the meat. In fact, this attempt has even been taken a step further in the prior art by providing three consecutive comminuting assemblies with the apertures in the plate member of the first assembly being larger, those in the second assembly being smaller and those in the plate member of the third assembly being smallest. However, not only does this require a still more complicated arrangement for adjusting the contact pressures, it also has not resulted in elimination of the aforementioned problems.

A further approach in comminuting apparatus utilizes two concentric cutting members each having an annulus of comminuting teeth, with one of the cutting members rotating with reference to the other and with the material to be comminuted passing between the teeth of the two members radially outwardly by centrifugal force so as to undergo thorough comminution during travel between the cutting edges of the rotary and stationary cutting members. Comminuting apparatus of this type is known for instance from my U.S. Pat. Nos. 3,443,614, 3,450,181, 3,429,350 and 3,399,704. Apparatus of this type has been found to provide for excellent comminution of all types of material, including meat containing the difficult-to-comminute components mentioned earlier.

While the latter type of comminuting apparatus has been found to avoid the problems encountered with the first-described type, it also suffers from a problem which, although not serious as the problems which have been outlined with reference to the first-described type of comminuting apparatus, nevertheless requires improvement. Specifically, material such as meat comminuted with the first-mentioned type of comminuting apparatus presents a visual appearance which is entirely different from the appearance presented by material comminuted with the latter-mentioned type of comminuting apparatus. This is not to say that one or the other appearance is aesthetically more or less pleasing; the fact is, however, that occasionally customers exhibit a subjective preference for comminuted material, particularly meat, having the appearance which heretofore could be obtained only by using the first-mentioned type of comminuting apparatus which, however, always presented the disadvantages described herein in detail.

SUMMARY OF THE INVENTION

It is, accordingly, an object of the present invention to provide a comminuting apparatus which provides a comminuted product having the visual appearance of materials comminuted with the type of comminuting apparatus mentioned first in the introductory portion of this specification, but which avoids the disadvantage of that type of apparatus and provides the advantages provided with the second-mentioned type of comminuting apparatus.

A further object of the invention is to provide such a comminuting apparatus which is simple in its construction and highly reliable in its operation. An additional object of the invention is to provide such a comminuting apparatus wherein the comminuted material not only undergoes comminution but also homogenization and emulsification.

An additional object of the invention is to provide a comminuting apparatus of the type under discussion which is highly versatile.

In pursuance of the above objects, and other which will become apparent hereafter, one feature of the invention resides in an apparatus for comminuting means and similar materials which, briefly stated, comprising housing means having an inlet for material to be comminuted, a first comminuting assembly, a second comminuting assembly and drive means for the comminuting assemblies. The first comminuting assembly is arranged in the housing in the path of material entering through the inlet and includes a pair of concentric annular comminuting members each having a set of circumferentially distributed cutting edges facing the corresponding set on the other comminuting member so that material passing between the comminuted members is comminuted by these cutting edges. The second comminuting assembly is arranged downstream of the first assembly in the path of material comminuted by the latter and comprises a stationary apertured plate member and a cutter member mounted adjacent one major surface of the plate member of rotation about an axis transverse to the major axis and in sliding contact with the latter. Drive means serves to effect rotation of one of the annular comminuting members of the first assembly with reference to the other member, and for rotating the cutter member of the second assembly with reference to the associated plate member.

Advantageously, the housing means is a single housing defining an interior chamber in which both comminuting assemblies are arranged, with the rotatable components of both assembles being mounted on a common rotary shaft. The cutter member of the second assembly must engage the major surface of the associated plate member with some pressure, and in a particularly simple structural solution of this problem the cutter member surrounds the rotary shaft being axially slidable relative to the same toward and away from the plate member, with a spring being provided which biases the cutter member against the plate member. It is advantageous that the spring bear upon the rotating comminuting member of the first comminuting assembly. To assure that all knives provided on the cutter member will always be in proper contact with the major surface of the associated plate member, the cutter member may be rockably mounted on the rotary shaft. Further, each individual cutter knife associated with the cutter member may itself be rockably mounted on the cutter member to further assure proper contact with the plate member and to compensate for manufacturing tolerances.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTIONS OF THE DRAWING

DESCRIPTION OF THE PREFERRED EMBODIMENTS

Figure 1:
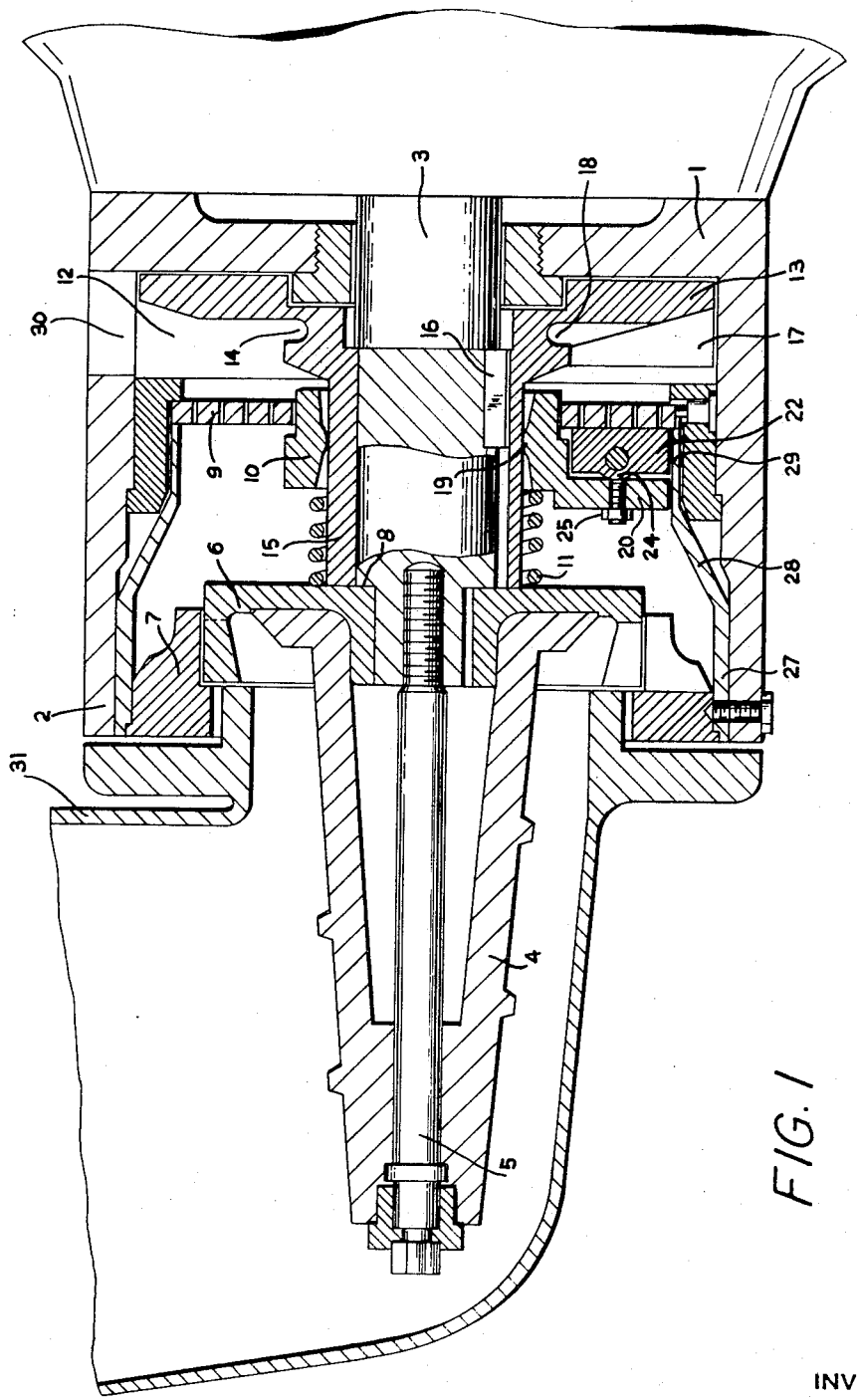
FIG. 1 is an axial sectional elevation of a comminuting apparatus according to the present invention.

Discussing now the drawing in detail it will be seen that reference numeral 1 identifies a transverse wall or a housing 2, with a rotary drive shaft 3 centrally penetrating the transverse wall 1 and extending into the interior of the housing 2. The drive shaft 3 may for instance be the output shaft of a nonillustrated electric motor. Secured to the free end of the drive shaft 3 for rotation therewith is a feed screw 4 which extends into a hopper 31 into which material to be comminuted is introduced and which hopper 31 communicates with the inlet of the housing 2. A spindle 5 is threaded into the drive shaft 3 and connects the latter with the feed screw 4, and it will be understood that the purpose of the feed screw 4 is to feed material from the hopper 31 into the interior of the housing 2 when the shaft 3 is rotated.

There is further provided on the drive shaft 3 an inner annular comminuting member 6 which is secured to the drive shaft 3 for rotation therewith in the manner illustrated in FIG. 1, and which thus rotates within the confines of an outer annular comminuting member 7, with the members 6 and 7 together constituting a first comminuting assembly. The spindle 5 serves to press the inner annular comminuting member 6 firmly against a shoulder 8 of the drive shaft 3 via the intermediary of the feed screw 4.

The comminuting members 6 and 7 are each provided with a plurality of circumferentially distributed teeth with the teeth of each comminuting member having cutting edges facing the cutting edges on the teeth of the other comminuting member. The precise construction of the comminuting members 6 and 7 does not form a part of the present invention and may be ascertained by reference to my aforementioned U.S. patents wherein it is clearly disclosed.

Arranged downstream of the first comminuting assembly is a second comminuting assembly consisting of an apertured plate member 9 stationarily mounted in the housing 2, and a cutter member 10 which rotates with the drive shaft 3 with reference to the plate member 9 in contact with one major surface of the latter, as will be discussed subsequently. A spring 11 bears against the annular comminuting member 6 and the cutter member 10, respectively, and serves to urge the cutter member 10 into engagement with the apertured plate member 9. It is advantageous, although not necessary, that means be provided permitting the cutter member 10 to perform rocking motions with reference to the drive shaft 3, and such means is to be seen in the inner circumferential bead 19 provided on the inner surface of the hub of the cutter member 10 with which bead 19 the cutter member 10 engages the drive shaft or the sleeve portion 15 surrounding the drive shaft and which will be discussed subsequently.

Located downstream of the apertured plate member 9 is an annular gap 12 defined between the circumferential wall of the housing 2 and the transverse wall 1 thereof. It is into this gap 12 that material comminuted by the second comminuting assembly 9, 10 will enter. Arranged in the gap 12 for rotation therein in parallelism with the apertured plate member 9 and directly adjacent the end wall 1, is a plate member 13 provided with a circumferential annular groove 14 and which plate element 13 merges into the aforementioned sleeve portion 15 surrounding the drive shaft 3 concentrically. The plate element 13 rotates with the drive shaft 3 and for this purpose is connected with the same with the member 16, which may for instance be a woodruff key or the like. The free end of the sleeve portion 15 abuts against the annular comminuting member 6. A plurality of radially extending ribs 17 are provided on the plate element 13 projecting into the annular gap 12 and thus forming respective passages 18 for the comminuted material.

Because of the presence of the sleeve portion 15 the cutter member 10 is mounted on the exterior thereof slidable axially of the sleeve portion 15 as well as of the drive shaft 3. However, in the absence of the sleeve portion 15 the cutter member 10 could of course be directly surrounding the drive shaft 3.

Figure 2:
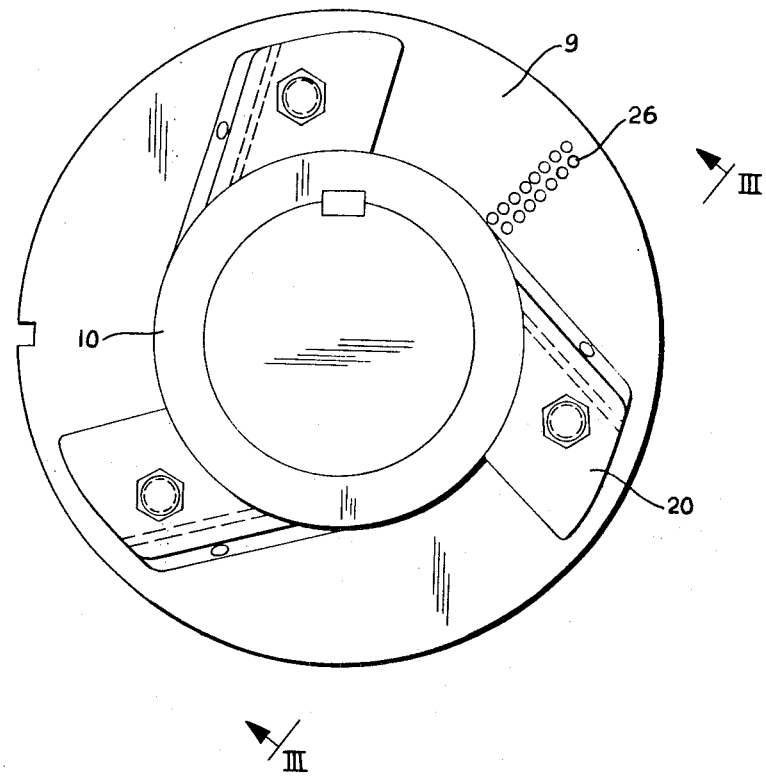
FIG. 2 is a plan view of the second comminuting assembly of the apparatus shown in FIG. 1.
Figure 3:
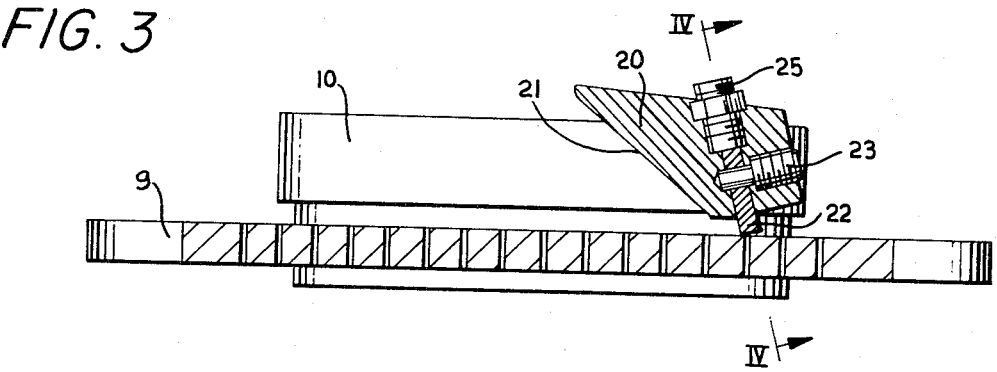
FIG. 3 is a section taken on the line III—III of FIG. 2.
Figure 4:
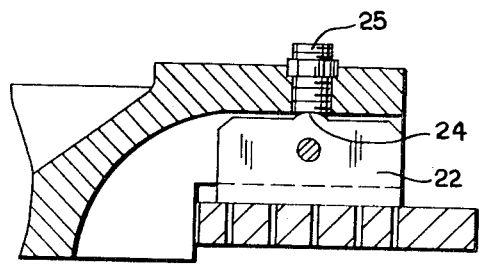
FIG. 4 is a section taken on the line IV—IV of FIG. 3.

As a reference to FIGS. 3 and 4 will show, the cutter member 10 comprises a plurality of inclined arms 20. The edge faces of these arms 20 which face forwardly in the direction of rotation are configurated as downwardly inclined edges 21 as shown in FIG. 3. Each of the arms 20 carries a knife blade 22 which according to the invention is secured only by a single screw 23. To provide for automatic adjustment of the knife blades 22 with reference to the surface of the plate member 9, that is to assure that the cutting edges of the knife blades 22 will always properly contact the plate member 9, the knife blades 22 are preferably although not necessarily mounted with freedom of rocking movement with reference to the respective arm 20 about the mounting screws 23. For this purpose each rear edge face of the respective knife blades 22 is provided with a projection 24 intermediate its opposite ends which abuts against an adjustment screw 25 threaded into the respective arm 20. This is shown in FIG. 4. FIG. 2 shows the relationship of the arms 20 with reference to one another, and reference numeral 26 in FIG. 2 identifies some of the apertures in the plate member 9, it being understood that a great number of such apertures 26 are provided and that only some are shown in FIG. 2 for purposes of illustration.

According to the invention guide means is provided for guiding material comminuted by the first comminuting assembly towards the second comminuting assembly. Such guide means is illustrated in FIG. 1 in form of a tubular member comprising a cylindrical first portion 27 which surrounds the first comminuting assembly 6, 7 radially thereof, a second cylindrical portion 29 of smaller diameter which surrounds the cutter member 10 of the second comminuting assembly, and an intermediate portion 28 whose cross section converges in direction from the first end portion 27 towards the second end portion 29. It is advantageous that the inner circumferential surface of the tubular member be provided in the region of the second end portion 29 with a plurality of surface discontinuities, for instance recesses, projections, ribs or the like, which preferably are elongated in axial direction of the tubular member and therefore of the drive shaft 3. This is not shown but is advantageously provided because it serves to prevent material from adhering to the inner circumferential surface and sweeping along with the same rather than being forced to pass through the second comminuting assembly 9, 10.

Material to be comminuted is introduced in the hopper 31 from which it is fed by the feed screw 4 to the rapidly rotating substantially cup- or pot-shaped annular comminuting member 6. Entering the same along the exterior surface of the feed screw 4, it is forced under the influence of centrifugal force against the cutting edges provided in the outer sidewall of the annular comminuting member 6, and comminuted between these cutting edges and the cooperating cutting edges provided on the stationary comminuting member 7. This provides a somewhat coarse comminuting action which is, however, sufficient to comminute all components of the material, including in the case of meat such components as rinds, tendons, gristles and the like. The material comminuted in the assembly 6, 7 issues substantially radially from the same, or more specifically from the stationary comminuting member 7 thereof, and then moves along the inner circumferential surface of the portions 27, 28 and 29 of the tubular guide member towards the cutter member 10 of the second comminuting assembly 9, 10. Because of the high centrifugal forces acting upon the material, and more particularly upon the individual fragments of the material as they undergo comminuting in the first comminuting assembly 6, 7, the material at this point is already relatively homogeneous and can therefore by comminuted without any difficulty by the cutter knives 22 which cooperate with the apertured plate member 9, to be pressed through the apertures 26 of the latter. Thus, the comminuting action of the second comminuting assembly 9, 10 takes place in axial rather than in radial direction. The now finally comminuted material passes into the annular gap 12 and is carried along by the radial ribs 17 of the plate element 13, these ribs 17 serving to provide an expelling action. The quickly rotating outlet openings 18 provide an emulsification effect.

Because in accordance with the present invention the diameter of the plate element 13 is preferably larger than that of the apertured plate member 9, the comminuted material does not contact the end wall 1 of the housing 2, but is instead guided into the outlet opening 30 so that no frictional heat can develop.

The comminuting assemblies 6, 7 and 9, 10 may be removed for inspection and/or replacement simply by removing the hopper 31, which for this purpose may be pivotably mounted on the housing 2, and releasing the spindle 5. There is no need to provide any instrumentality for regulating the pressure with which the cutter member 10 contacts the apertured plate member 9, and in fact this pressure can be rather small as compared with known comminuting devices utilizing this type of comminuting assembly, because by the time the material reaches the comminuting assembly 9, 10 the material components which normally require strong contact between the elements 9 and 10 have already undergone initial comminution in the comminuting assembly 6, 7.

The apparatus according to the present invention is exceedingly simple in its construction and therefore inexpensive to manufacture and reliable in its operation. The entire quantity of material admitted through the hopper 31 is comminuted with the apparatus according to the present invention, and no residue consisting, in the case of meat, of gristle, tendons, rinds or the like will remain because all such components are effectively comminuted by the comminuting assembly 6, 7. On the other hand, the frictional heating of the members 9 and 10 which has been found so objectionable in prior art construction using this type of comminuting assembly is avoided, or almost completely avoided, because as mentioned before the pressure with which the knife blades 22 of the cutter member 10 must engage the apertured plate member 9 is so low as to obviate or almost obviate this problem.

The apparatus according to the present invention is also highly versatile because the ease with which the comminuting assemblies 6, 7 and 9, 10 may be removed makes it possible to replace the assembly 9, 10 for ordinary use with a second assembly corresponding to the assembly 6, 7, and to temporarily install the assembly 9, 10 only at such times as it is desired to obtain a final comminuted product having the visual appearance in question. This makes the apparatus of course much more versatile than would otherwise be possible.

The presence of the plate element 13 avoids frictional contact of the comminuted material with the end wall 1, and thereby heating of the comminuted material because of the speed with which the latter would ordinarily sweep over the stationary end wall 1. This is disadvantageous with reference to the quality of the comminuted material, and in particular it can lead to a separation of the fat contained in the material if the same is meat or an analogous substance. The presence of the outlet openings 18 has been found through a series of extensive tests to produce an emulsification effect on the comminuted material, which is of course desirable in further improving the consistency of the material, particularly of comminuted meat.

It will be understood that each of the elements described above, or two or more together, may also find a useful application in other types of constructions differing from the types described above.

While the invention has been illustrated and described as embodied in a comminuting apparatus, it is not intended to be limited to the details shown, since various modifications and structural changes may be made without departing in any way from the spirit of the present invention.

What is claimed is:

1. In an apparatus for comminuting meat and similar material, a combination comprising housing means having an inlet for material to be comminuted; a first comminuting assembly arranged in said housing means in the path of material entering through said inlet, and including a pair of concentric annular comminuting members each having a set of circumferentially distributed cutting edges facing the corresponding set on the comminuting member so that material passing between said comminuting members is comminuted by said cutting edges; a second comminuting assembly arranged downstream of said first comminuting assembly in the path of material comminuted by the same, said second comminuting assembly comprising a stationary apertured plate member having a major surface facing said first comminuting assembly, a cutter member being slidable axially and mounted adjacent said major surface of said plate member for rotation about an axis transverse to said major surface in sliding contact with the latter and biasing means bearing against said cutter member and urging the same into sliding contact with said major surface; and drive means for rotating one of said annular comminuting members with reference to the other, and for rotating said cutter member about said axis with reference to said plate member.

2. In an apparatus as defined in claim 1, said housing means defining an interior chamber, and said first and second comminuting assemblies both being arranged in said interior chamber.

3. In an apparatus as defined in claim 1 wherein said drive means comprises a rotary shaft, and wherein said one annular comminuting member and said cutter member are both mounted on said shaft for rotation therewith.

4. In an apparatus as defined in claim 3, wherein said spring means comprises a biasing spring bearing against said cutter member and one of said annular comminuting members.

5. In an apparatus as defined in claim 3; and further comprising means maintaining for said cutter member freedom of limited rocking movement about and with reference to said shaft.

6. In an apparatus as defined in claim 3, said cutter member comprising a support and a plurality of knife blades; and further comprising securing means securing said knife blades to said support with limited freedom of rocking movement relative thereto.

7. In an apparatus as defined in claim 6, said knife blades each having an elongated edge face facing a surface of said support, said edge face having opposite ends and being provided intermediate said ends with a protuberance abutting against said surface of said support; and wherein said securing means comprises a plurality of securing screws each securing one of said knife blades to said support with freedom of rocking movement about the respective protuberance.

8. In an apparatus as defined in claim 7, said cutter member being slidable axially of said shaft toward and away from said major surface; and spring means biasing said cutter member towards said major surface so as to maintain said knife blades in sliding contact with the same.

9. In an apparatus as defined in claim 8, said cutter member further comprising a plurality of adjusting screws each threaded into said support and each having a free end portion, and wherein each of said protuberances abuts against one of said free end portions.

10. In an apparatus as defined in claim 1 and further comprising guide means for guiding comminuted material from said first comminuting assembly to said second comminuting assembly.

11. In an apparatus as defined in claim 10, said guide means comprising a tubular member extending between said assemblies and having an inner circumferential surface along which comminuted material moves from said first to said second comminuting assembly.

12. In an apparatus as defined in claim 11, wherein said tubular member comprises two spaced end portions one of which has a first internal diameter and surrounds said first comminuting assembly radially outwardly thereof and the other of which has a smaller second internal diameter and surrounds said cutter member radially outwardly thereof, and an intermediate portion connecting said end portions and having an internal diameter which converges indirection towards said other end portion.

13. In an apparatus as defined in claim 3, said housing means including a circumferential wall and a transverse wall defining downstream of said second comminuting assembly an annular space into which material comminuted by said second assembly enters; and further comprising a plate element mounted in said annular space adjacent to said end wall in parallelism with said apertured plate member, said plate element being rotatable together with said cutter member about the axis of rotation of the latter.

14. In an apparatus as defined in claim 13, said plate element including a sleeve portion penetrating said apertured plate member through a central opening thereof and concentrically surrounding said shaft connected to the latter for rotation therewith, and wherein said cutter member is mounted on said sleeve portion surrounding the same and having limited freedom of rocking movement relative thereto.

15. In an apparatus as defined in claim 13, said plate element having a surface facing said apertured plate member, and being provided on said surface with a plurality of radially extending ribs.

16. In an apparatus as defined in claim 15, wherein said plate element has a diameter greater than the diameter of said apertured plate member.

17. In an apparatus as defined in claim 15, said plate element including a central opening and said ribs extending radially of said opening, and wherein said surface is provided with a radial groove encircling said central opening and the bases of the respective ribs.

18. In an apparatus as defined in claim 1, wherein said second comminuting assembly is replaceably mounted in said housing means so as to be replaceable with a comminuting assembly similar to said first comminuting assembly at the will of an operator.

* * * * *